United States Patent Office 2,807,559
Patented Sept. 24, 1957

2,807,559

CUBE SUGAR PROCESS AND PRODUCT

Helen J. Steiner, New York, N. Y.

No Drawing. Application December 29, 1954,
Serial No. 478,513

6 Claims. (Cl. 127—30)

This invention relates to sugar compositions. More specifically, the invention concerns sugar in lump, cube or other aggregated forms.

Lump or cube sugar is conventionally made by mixing sucrose in granulated or other subdivided form, with sugar syrup, molding the mixture in slab or cube form and applying heat for an extended period of time to drive off the water content of the syrup binder. While attempts have been made to improve such procedure by providing special pre-treating, molding and baking equipment, the baking period is quite lengthy and may be several hours.

Furthermore, cube or lump sugar does not readily disperse and dissolve in liquids at room temperature or lower temperatures, such as water, iced tea and the like.

Accordingly, an object of this invention is to provide a sugar composition in lump, cube or other aggregated form which includes a binder originally in molten form, whereby a mixture of sucrose and binder may be molded in desired shape or form and quickly brought to final aggregated form by a very short cooling interval.

Another object of this invention is to provide sugar in aggregated form and including a binder which permits cubes or lumps of sugar to disperse rapidly in liquids at room temperature or lower temperatures, such as water, iced tea or the like.

A further object of this invention is to provide a sugar composition in lump, cube or other aggregated forms, which includes a small amount of binder having a melting point less than the decomposing or charring temperature of the sugar; is readily dispersed in water at room temperature or lower temperatures; and which is inert and is devoid of any taste or flavor incompatible with the sweetening properties of the sugar.

Other objects of this invention will in part be obvious and in part hereinafter pointed out.

Sugar compositions made in accordance with the present invention allows for substantial economies in the production of sugar in lump, cube or other aggregated forms by materially reducing production time, eliminating the need for special equipment and obtaining increased output from equipment used. Furthermore, the resultant product can now be used as a sweetening agent for cold drinks at all times and particularly in warm weather when granulated and powdered sugars tend to cake unless sealed in special packages.

Compositions according to the present invention are made by providing a binder such as sorbitol or the like, in dry molten form, mixing a small amount of such binder with sucrose in granulated, powdered or other subdivided form, placing the mixture in molds of desired configuration, tamping the mixture in the molds to a desired density and allowing the molded composition to cool. The thus formed aggregate, if in lump or cube form may be directly packaged or wrapped for packaging, and if in slab form may be cut into desired shapes.

Specific examples illustrating tthe compositions of this invention are presented.

*Example 1*

6 grams of sorbitol was melted and mixed with 150 grams of granulated sucrose. The sucrose particles were well coated with the molten material and then cast into cube molds where the mixture was lightly tamped. After cooling, the cubes were removed from the molds. Such cubes, on being dropped into water at room temperature, became dispersed therein within 8 seconds. A conventional sugar cube, similarly tested, took 15 minutes to become dispersed in the water.

*Example 2*

Granulated sucrose was aggregated into cube form as in Example 1 except that 12 grams of molten sorbitol was mixed with the sucrose. The dispersion interval for such cubes in water was also 8 seconds.

*Example 3*

Example 1 was repeated except that 24 grams of molten sorbitol was mixed with the 150 grams of the granulated sucrose. Such composition produced well molded cubes which had a dispersion time in water of about 14 seconds.

*Example 4*

Example 1 was repeated except that 3 grams of molten sorbitol was used as a binder for 150 grams of sucrose. The cubes molded from such composition had a dispersion time in water of 5 seconds.

*Example 5*

Example 1 was repeated except that a mixture of 6 grams of sorbitol and 6 grams of mannitol were melted to provide a binder for 150 grams of sucrose. Cubes molded from this composition had a dispersion time in water of about 5 seconds.

*Example 6*

Example 1 was repeated except that 12 grams of molten dextrose replaced the sorbitol. Resultant cubes had a dispersion time in water of 15 seconds.

*Example 7*

Example 1 was repeated except that 12 grams of molten gluconolactone replaced the sorbitol. The cubes made from this composition had a dispersion time in water of about 15 seconds.

The foregoing examples were repeated using finely powdered sucrose instead of the granulated form. Well molded cubes were formed which were quickly dispersed in water at room temperature. On dropping cubes of sugar compositions of the instant invention in iced tea, the dispersion intervals were only slightly increased.

It is understood that various saccharides, saccharide derivatives and the like, which have melting points below the decomposition point of the sucrose particles and which do not adversely affect the sweetening properties of the sucrose, may also be used in molten form as binders for the sucrose.

Thus, one may use xylose, fructose, arabinose, mannose, maltose, raffinose, sorbose and the like. Such materials including derivatives thereof such as arabonic acid and the like are reduced to molten form and mixed with the granulated or powdered sucrose and molded as described above. The binders may be used in amounts ranging from between 2% to 16% by weight. It has been found that the binders do not adversely affect the sweetening properties of the sucrose and in most cases are scarcely perceptible to the taste.

The utilization of various binder agents other than those specifically disclosed herein, which have the requisite properties of being edible, easily dispersed in cold water, having melting points less than the decomposition point of sucrose and a taste compatible with that of sucrose, will readily suggest themselves to those skilled in the art. Accordingly, the examples set forth herein are to be deemed illustrative and not by way of limitation.

Having thus disclosed my invention, I claim as new and desire to protect by Letters Patent:

1. A method of forming sucrose in lump, cube or other aggregated forms comprising mixing from about 84% to about 98% by weight of sucrose particles with from about 2% to about 16% by weight of a dry molten binder to coat said particles with said binder, said binder being selected from the group consisting of edible and water dispersible sorbitol, dextrose, gluconolactone, mannitol, xylose, fructose, arabinose, mannose, maltose, raffinose, sorbose and arabonic acid, said binder having a melting point less than the decomposition point of said sucrose particles, forming said mixture into desired shape and cooling the formed mixture.

2. The product produced by the method of claim 1.

3. A method as in claim 1 wherein said formed mixture is compressed before cooling.

4. The product produced by the method of claim 3.

5. A method of forming sucrose particles in lump, cube or other aggregated form comprising mixing the particles with about 8% by weight of dry molten sorbitol, casting the mixture in desired form, and cooling the cast mixture.

6. The product produced by the method of claim 5.

References Cited in the file of this patent

UNITED STATES PATENTS

| | | |
|---|---|---|
| 124,197 | Donner | Mar. 5, 1872 |
| 163,667 | Langen | May 25, 1875 |
| 264,035 | Jebb | Sept. 5, 1882 |
| 264,036 | Jebb | Sept. 5, 1882 |
| 268,492 | Jebb | Dec. 5, 1882 |
| 318,639 | Matthiessen | May 26, 1885 |
| 372,030 | Krause | Oct. 25, 1887 |
| 1,154,557 | Armstrong | Sept. 21, 1915 |
| 1,175,114 | Bauer | Mar. 14, 1916 |

OTHER REFERENCES

Mannitol and Sorbitol; reprint from the Am. J. Pharm., vol. 113, No. 4, April 1941, reprint pp. 1–8 (p. 5 pertinent).